United States Patent
Yoo et al.

(10) Patent No.: US 8,908,018 B2
(45) Date of Patent: Dec. 9, 2014

(54) APPARATUS AND METHOD FOR DISPLAYING THREE-DIMENSIONAL IMAGE

(75) Inventors: Yong-Su Yoo, Gyeonggi-Do (KR); Yong-Tae Yoo, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 461 days.

(21) Appl. No.: 12/982,176

(22) Filed: Dec. 30, 2010

(65) Prior Publication Data

US 2011/0157335 A1  Jun. 30, 2011

(30) Foreign Application Priority Data

Dec. 30, 2009  (KR) .................. 10-2009-0133779

(51) Int. Cl.
| | | |
|---|---|---|
| *H04N 13/04* | (2006.01) | |
| *H04N 9/47* | (2006.01) | |
| *G09G 3/00* | (2006.01) | |
| *G02B 27/22* | (2006.01) | |

(52) U.S. Cl.
CPC ............ *G02B 27/2264* (2013.01); *G09G 3/003* (2013.01); *G09G 2360/16* (2013.01); *H04N 13/0434* (2013.01); *H04N 13/0497* (2013.01); *H04N 13/0438* (2013.01)
USPC ................................. 348/56; 348/52; 348/51

(58) Field of Classification Search
USPC .......................................................... 348/56
See application file for complete search history.

(56) References Cited

U.S. PATENT DOCUMENTS

| | | | |
|---|---|---|---|
| 5,856,843 A * | 1/1999 | Muramoto ...................... 348/52 |
| 2002/0135667 A1* | 9/2002 | Sakakibara et al. .......... 347/250 |
| 2004/0145655 A1* | 7/2004 | Tomita ............... 348/51 |
| 2004/0233276 A1* | 11/2004 | Palovuori ....................... 348/56 |
| 2007/0229951 A1* | 10/2007 | Jung et al. ..................... 359/465 |
| 2008/0231689 A1* | 9/2008 | Larson ............................ 348/51 |
| 2008/0239484 A1* | 10/2008 | Fukaishi et al. .............. 359/465 |
| 2010/0238274 A1* | 9/2010 | Kim et al. ....................... 348/51 |

FOREIGN PATENT DOCUMENTS

| | | |
|---|---|---|
| CN | 1749808 A | 3/2006 |
| CN | 1925626 A | 3/2007 |
| CN | 101038371 A | 9/2007 |
| CN | 101047872 A | 10/2007 |
| CN | 101159881 A | 4/2008 |
| JP | 2009-230071 | 10/2009 |
| KR | 10-0855040 | 8/2008 |

* cited by examiner

*Primary Examiner* — Hee-Yong Kim
(74) *Attorney, Agent, or Firm* — McKenna Long & Aldridge LLP (57) ABSTRACT

A method for displaying a three-dimensional (3D) image includes: alternately displaying a left eye image and a right eye image; calculating a luminance value of a displayed image to detect a peak value of a luminance value; comparing the detected peak value and a stored peak value, and when the detected peak value corresponds to a right eye peak value, determining that a current image is a right eye image, and when the detected peak value corresponds to a left eye peak value, determining that the current image is a left eye image; outputting a synchronization signal according to the determination result; and making the left eye image and the right eye image reach a user's left eye or right eye according to the synchronization signal.

9 Claims, 5 Drawing Sheets

RIGHT IMAGE

LEFT IMAGE

APPARATUS AND METHOD FOR DISPLAYING THREE-DIMENSIONAL IMAGE

CROSS-REFERENCE TO RELATED APPLICATIONS

Pursuant to 35 U.S.C. §119(a), this application claims the benefit of earlier filing date and right of priority to Korean Application No. 10-2009-0133779 filed on Dec. 30, 2009, the content of which is incorporated by reference herein in its entirety.

BACKGROUND OF THE INVENTION

1. Field of the Invention

The present invention relates to an apparatus and method for displaying three-dimensional (3D) image and, more particularly, to an apparatus and method for displaying a 3D image capable of constantly displaying a 3D image by synchronizing a left-eye image and right-eye image and a display device.

2. Description of the Related Art

Services to be realized for a high speed transmission of information formed based on a high speed information communication network are advancing from a simple 'listening and speaking service' such as that of the current communication device to a multimedia service based on a digital terminals that processes text, voice, images at a high speed. Eventually, services are expected to be advanced to a superspace realistic 3D stereoscopic information communication service allowing users to feel and enjoy realistically and three dimensionally beyond time and space.

In general, a stereoscopic image representing three dimensions is displayed based on a stereoscopic visual principle through the user's two eyes. Because the parallax between the two eyes, namely, a binocular parallax, generated because the user's two eyes are away by about 65 mm, is a key factor of a stereoscopic sense. Namely, the left and right eyes see mutually different 2D images, and when the two images are transferred to the user's brain through the retina, the user's brain precisely unites the two images to reproduce a depth sense and a realistic sense of the original 3D image.

Such capability is generally called stereography. Currently, a technique proposed to display a 3D stereoscopic image on a 2D screen image includes a glassless stereoscopic (or autostereoscopic) image display scheme, a holographic display scheme, a glass type stereoscopic image display scheme based on time division, and the like.

The glassless stereoscopic image display scheme may be divided into a parallax barrier scheme in which images are separately observed through an aperture in a vertical lattice-like shape in front of the respective images corresponding to the left and right eyes, a lenticular scheme using a lenticular plate including semicircular lenses arranged, and an integral photography scheme using a lens plate having the shape of a fly's eye.

The holographic display scheme can obtain a 3D stereoscopic image having all the factors, such as focusing, auditory parallax, binocular parallax, motion parallax, and the like, which generates a stereoscopic sense, and it is classified into a laser reproduction hologram and a white light reproduction hologram.

The glassless stereoscopic image display scheme is advantageous in that the user does not need to put on glasses but has a problem in that an observation range is fixed to be limited to a small number of users and a stereoscopic image is not smoothly implemented according to positions of observers (or users).

The holographic display scheme is advantageous in that a 3D stereoscopic image can be displayed regardless of locations from which the image is viewed and a plurality of observers can use it simultaneously. However, because laser reference light must be additionally used to display a 3D image, it has a problem in that there is a difficulty in terms of technique and the space occupied by equipment is increased.

Meanwhile, the glass type stereoscopic image display scheme based on time division employs special glasses such as time division glasses, allowing a large number of users to enjoy stereoscopic images regardless of their locations.

The stereoscopic image display scheme based on special glasses includes a display scheme using shutter glasses and a display scheme using a phase retardation plate. In the display scheme using shutter glasses, while a left eye image is being displayed, a left eye part of the shutter glasses allows light to transmit therethrough and a right eye part blocks light. Also, while a right eye image is being displayed, the right eye part of the shutter glasses allows light to transmit therethrough and the left eye part blocks light.

In the display scheme using a phase retardation plate, a phase retardation plate is disposed on a front surface of a display panel, so while the right eye image is being displayed, the phase retardation plate is turned on (or off) to polarize light in one direction, and while the left eye image is being displayed, the phase retardation plate is turned off (or on) to polarize light in another direction, and in this case, the user wears polarization glasses, and a polarization plate having an optical axis parallel to a polarization direction of light when the phase retardation plate is turned on is provided at the right side and a polarization plate having an optical axis parallel to a polarization direction of light when the phase retardation plate is turned off is provided at the left side to alternately recognize images with his right and left eyes, thus implementing a stereoscopic image.

However, the time division stereoscopic image display scheme as described above has the following problem.

That is, in the time division stereoscopic image display scheme having the foregoing configuration, the left eye image is recognized with the left eye and the right eye image is recognized with the right eye, thus implementing a stereoscopic image. Thus, when the display device implementing an image, a system (an electronic device such as a television or the like) in which the display device is installed, and image data are not synchronized, the left eye image may be recognized by the right eye or the right eye image is recognized by the left eye, failing to implement a stereoscopic image.

Thus, in order to solve the problem, a reset button is provided. That is, when the synchronization is not made, a resetting operation is performed to return the display device to an initial synchronized state. In this case, however, as time goes by, the display device, the system, and the image data are not synchronized, so the resetting operation must be repeatedly executed, and because the resetting operation itself is performed by the user by directly manipulating the button, making the user feel inconvenient.

SUMMARY OF THE INVENTION

Therefore, in order to address the above matters, the various features described herein have been conceived.

An aspect of the present invention provides an apparatus and method for displaying three-dimensional (3D) image capable of constantly displaying a 3D image by synchronizing a left-eye image and right-eye image and a display device.

According to an aspect of the present invention, there is provided an apparatus for displaying three-dimensional (3D) image, including: a display device for displaying alternately the left eye image and the right eye image; and a system for generating image information regarding a left eye image and a right eye image and generating a synchronization signal for the left eye image and the right eye image to display alternately the left eye image and the right eye image on the display device, the system including: an image input unit for receiving the image to be displayed on the display device; an image discriminating unit for discriminating the left eye image or the right eye image from the image inputted from the image input unit; and a synchronization signal generating unit for generating a synchronization signal according to the discrimination result from the image discriminating unit to output the generated synchronization signal to the shutter glasses and the display device.

The apparatus further includes glasses for opening a left eye part or a right eye part according to the synchronization signal inputted from the system, the left eye part being opened and the right eye part being closed when the left eye image is displayed on the display device and the right eye part being opened and the left eye part being closed when the right eye image is displayed on the display device.

The image discriminating unit may include: a luminance value calculating unit for calculating a luminance value of the image signal of a current input image, a peak value detecting unit for detecting a plurality of peak values based on the luminance value calculated by the luminance value calculating unit, a peak value comparing unit for comparing the peak values detected by the peak value detecting unit with a pre-set peak value, and an image determining unit for determining the left eye image or the right eye image from the image displaying currently on the display device based on the comparison result by the peak value comparing unit.

According to another aspect of the present invention, there is provided an apparatus for displaying three-dimensional (3D) image, including: a system for generating image information for a left eye image and a right eye image; a display device controller for outputting a control signal according to the image information of the system to generate a synchronization signal for the left eye image and the right eye image; a display device for displaying alternately the left eye image and the right eye image according to the control signal inputted from the display device controller; and a phase retardation plate in which optical axis of the phase retardation plate is changed according to the synchronization signal inputted from the display device controller so that the optical axis of the phase retardation plate is parallel to a polarization axis of the left eye image when the left eye image is displayed and the optical axis of the phase retardation plate is parallel to the polarization axis of the right eye image when the right eye image is displayed.

According to another aspect of the present invention, there is provided a method for displaying a 3D image, including: alternately displaying a left eye image and a right eye image; calculating a luminance value of a displayed image to detect a peak value of the luminance value; comparing the detected peak value with a stored peak value, determining that a current image is a right eye image when the detected peak value corresponds to a right eye peak value, and determining that the current image is a left eye image when the detected peak value corresponds to a right eye peak value; outputting a synchronization signal according to the determination result; and reaching the left eye image and the right eye image to a user's left eye or right eye respectively according to the synchronization signal.

According to exemplary embodiments of the present invention, a synchronization signal is generated based on current image information to synchronize the shutter glasses or the phase retardation plate. Thus, because the current image and the shutter glasses or the phase retardation plate are always synchronized, a 3D image can be prevented from being broken due to nonsynchronization of the image and the shutter glasses or the phase retardation plate.

In addition, because the synchronization is automatically executed in real time, the user does not need to operate a synchronization button, improving user convenience and satisfying users.

The foregoing and other objects, features, aspects and advantages of the present invention will become more apparent from the following detailed description of the present invention when taken in conjunction with the accompanying drawings.

DETAILED DESCRIPTION OF THE INVENTION

Exemplary embodiments of the present invention will now be described with reference to the accompanying drawings.

Figure 1:
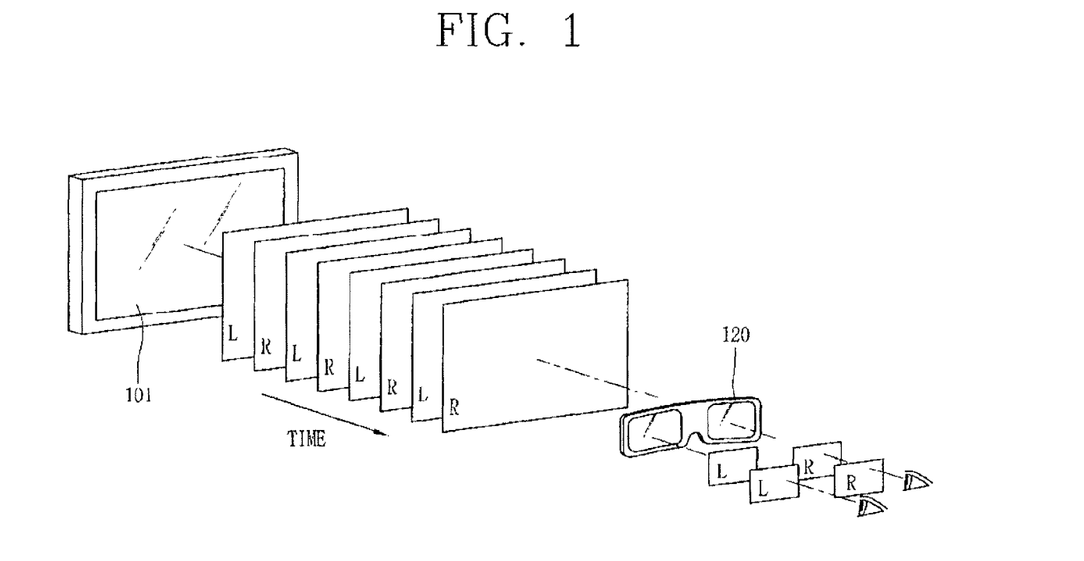
FIG. 1 is a conceptual view of an apparatus for displaying a three-dimensional (3D) image according to a first exemplary embodiment of the present invention.

FIG. 1 is a conceptual view of an apparatus for displaying a three-dimensional (3D) image based on time division according to a first exemplary embodiment of the present invention. In this case, the apparatus for displaying a three-dimensional (3D) image based on time division according to the first exemplary embodiment of the present invention employs shutter glasses.

As shown in FIG. 1, in the apparatus for displaying a three-dimensional (3D) image based on time division according to the present exemplary embodiment, a left eye image and a right eye image are alternately displayed on a display device 101 such as a liquid crystal display (LCD) or the like. Namely, the left eye image and the right eye image are alternately displayed over time.

Shutter glasses 120 are synchronized according to the left eye image (L) and the right eye image (R). Namely, when the left eye image (L) is displayed, a right eye part of the shutter glasses 120 is closed and a left eye part of the shutter glasses 120 is open, and when the right eye image (R) is displayed, the left eye part of the shutter glasses 120 is closed and the right eye part of the shutter glasses 120 is open. Accordingly, as the left eye image (L) and the right eye image (R) are alternately transmitted with the lapse of time, allowing the user's left and right eyes to view mutually different 2D images, and when the two images are transferred to the user's brain through the retina, the brain precisely unites the two images, allowing the user to recognize them as the original 3D image.

Figure 2:
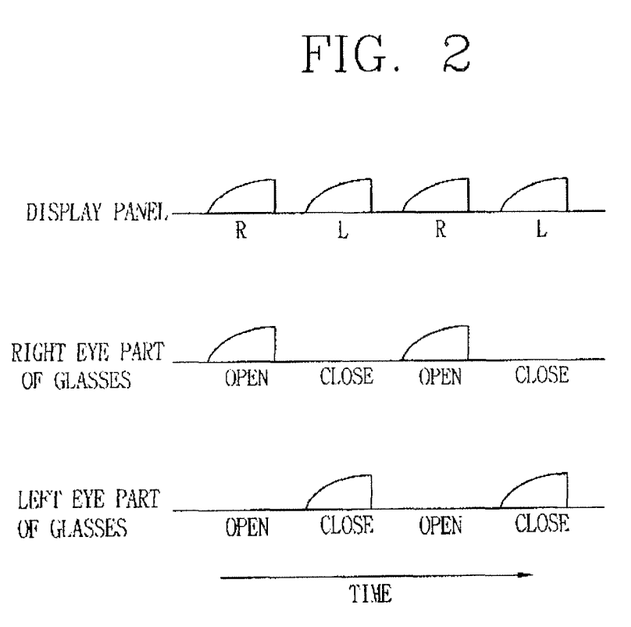
FIG. 2 is a view showing the relationship between an image and time in the apparatus for displaying a three-dimensional (3D) image according to the first exemplary embodiment of the present invention.

FIG. 2 is a view showing the relationship between an image and time in the apparatus for displaying a three-dimensional (3D) image according to the first exemplary embodiment of the present invention.

As shown in FIG. 2, the right eye image (R) and the left eye image (L) are alternately displayed over time, and in this case, the right eye image (R) and the left eye image (L) are displayed at a certain time interval to prevent generation of a crosstalk. In addition, a black image may be inserted between the right eye image (R) and the left eye image (L) in order to prevent generation of a crosstalk.

Although not shown, in case of an LCD, a backlight unit may be driven to provide light only when the right eye image (R) and the left eye image (L) are displayed. In other words, the backlight unit is operated only when the right eye image (R) and the left eye image (L) are display, and the backlight unit is not operated between the right eye image (R) and the left eye image (L).

The shutter glasses 120 is synchronized with an image displayed on the display device 101. As illustrated, the right eye part of the shutter glasses 120 is open when the right eye image is displayed and closed when the left eye image is displayed, so only the right eye image is recognized by the user's right eye. Also, the left eye part of the shutter glasses 120 is open when the left eye image is displayed and closed when the right eye image is displayed, so only the left eye image is recognized by the user's left eye. In this manner, the user's right eye and left eye alternately recognize the right eye image and the left eye image.

Synchronization of the shutter glasses 120 is made in a system such as a TV or the like. Namely, the system analyzes an image to be displayed on the display device to discriminate whether or not the corresponding image is a left eye image or a right eye image, synchronizes the image and the shutter glasses 120 to open and close the left eye part or right eye part of the shutter glasses 120, thus synchronizing the shutter glasses.

Figure 3:
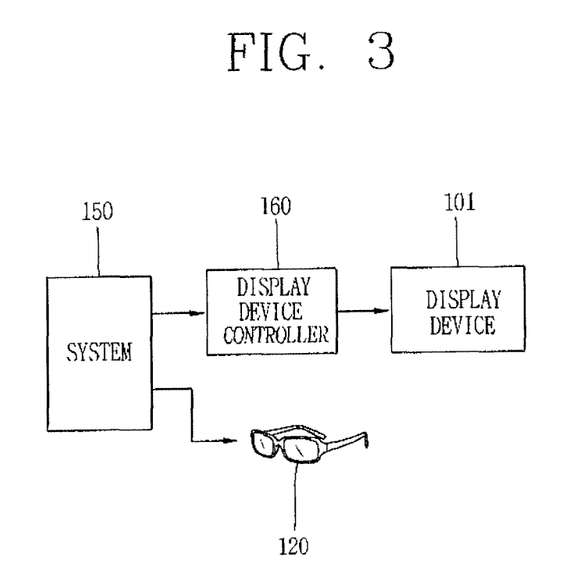
FIG. 3 is a schematic block diagram showing the structure of a system in the apparatus for displaying a three-dimensional (3D) image according to the first exemplary embodiment of the present invention.

FIG. 3 is a schematic block diagram showing the structure of a system in the apparatus for displaying a three-dimensional (3D) image based on time division according to the first exemplary embodiment of the present invention.

As shown in FIG. 3, the apparatus for displaying a three-dimensional (3D) image based on time division includes a system 150, such as a main body of a TV or an electronic device, for generating image information, a display device controller 160 for receiving the image information from the system 150 and outputting various signals including a control signal, a display device 101 for displaying an image according to the control signal inputted from the display device controller 160, and shutter glasses 120 for opening and closing its left and right eyes upon being synchronized with an image displayed on the display device 101 according to a synchronization signal wirelessly transferred from the system 150.

The system 150 generates an image signal of an image to be displayed and outputs it to the display device controller 160, so that the image can be displayed on the display device 101 according to the image signal. Also, the system 150 recognizes whether or not the current image is a right eye image or a left eye image and transfers the result to the shutter glasses 120 and the display device controller 160 to synchronize the shutter glasses 120 and the display device 101.

Figure 4:
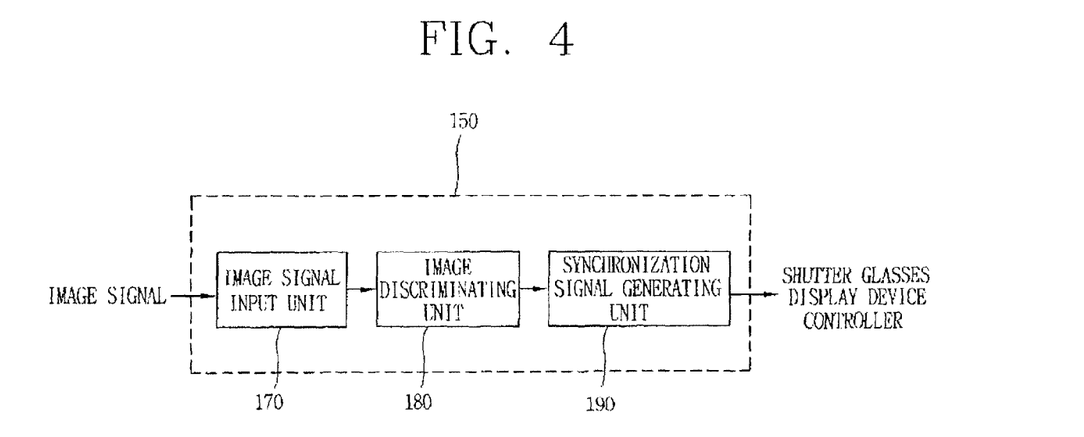
FIG. 4 is a schematic block diagram showing the structure of a system of the apparatus for displaying a three-dimensional (3D) image according to the first exemplary embodiment of the present invention.

FIG. 4 is a schematic block diagram showing the structure of the system 150 of the apparatus for displaying a three-dimensional (3D) image according to the first exemplary embodiment of the present invention. Substantially, the system 150 includes various elements for implementing various functions, but FIG. 4 illustrates only the configuration of synchronizing the shutter glasses 120 and the display device 101.

As shown in FIG. 4, the system 150 of the apparatus for displaying a 3D image based on time division includes an image input unit 170 to which an image to be displayed is inputted, an image discriminating unit 180 for discriminating whether or not the image inputted through the image input unit 170 is a left eye image or a right eye image, and a synchronization signal generating unit 190 for generating a synchronization signal according to the result of discrimination performed in the image discriminating unit 180 and outputting it to the display device controller.

Figure 5:
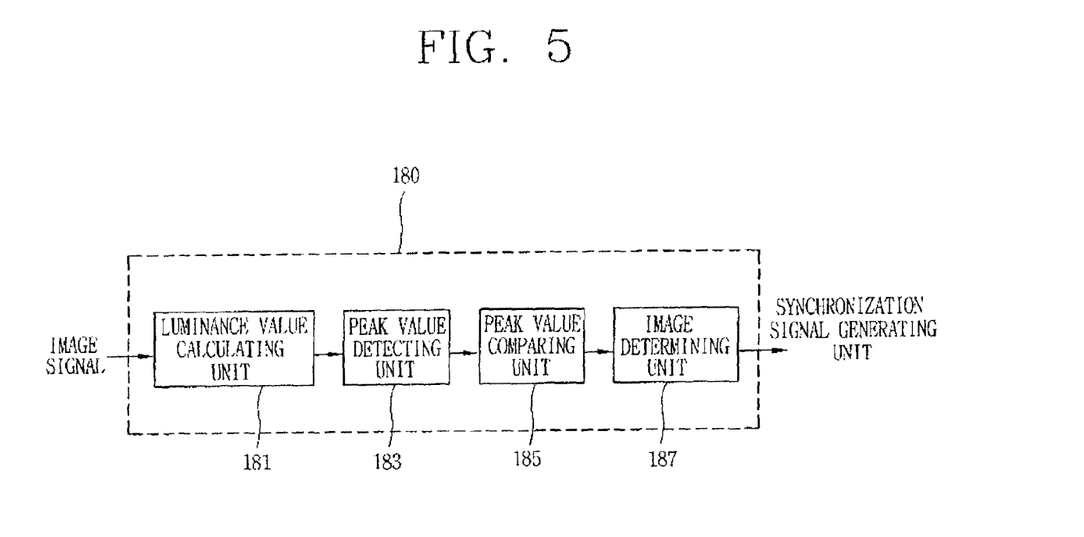
FIG. 5 is a schematic block diagram showing the structure of an image discriminating unit of the apparatus for displaying a three-dimensional (3D) image according to the first exemplary embodiment of the present invention.

As shown in FIG. 5, the image discriminating unit 180 includes a luminance value calculating unit 181 for calculating a luminance value of an image signal of a current frame inputted through the image signal input unit 170, a peak value detecting unit 183 for detecting N number of upper peak values based on the luminance value calculated by the luminance value calculating unit 181, a peak value comparing unit 185 for comparing the peak values detected by the peak value detecting unit 183 with a pre-set peak value, and an image determining unit 187 for determining whether or not the current image is a left eye image or a right eye image based on the comparison result from the peak value comparing unit 815.

The luminance value calculating unit 181 receives R, G, and B signals of an image to be displayed and converts them into a YCbCr color space. Namely, the luminance value calculating unit 181 converts the R, G, and B signals of the image into a YCbCr color space according to Equation 1 shown below:

$$Y = 0.183R + 0.614G + 0.062B$$

$$Cb = -0.101R - 0.338G + 0.439B + 128$$

$$Cr = 0.439R - 0.399G - 0.040G + 128 \quad\quad \text{[Equation 1]}$$

Among the values obtained by Equation 1 above, Y is a luminance component and Cb and Cr are chrominance components.

The peak value detecting unit 183 calculates a horizontal distribution of the luminance component by using a Y value with respect to the luminance component among the converted values, stores the same, and detects peak values of the stored luminance component and their positions on a horizontal line.

The peak value comparing unit 185 compares a peak value of the current image with a stored peak value. Namely, the peak value comparing unit 185 stores position information on the horizontal line with respect to a right eye image and position information on the horizontal line with respect to a left eye image, so the peak value comparing unit compares the peak value of the current image with the stored peak value of the image and outputs the corresponding results.

The image determining unit 187 determines whether or not the current image is a right eye image or a left eye image based on the information outputted from the peak value comparing unit 185. When the peak with respect to the current image is identical to the stored peak information, the image determining unit 187 determines whether or not the current image corresponds to the corresponding peak information to determine whether or not the current image is a right eye image or a left eye image.

Of course, the position of the peak value on the horizontal line, the position information of the stored right eye image on the horizontal line, and the position information of the left eye image on the horizontal line do not correspond precisely. However, because the image determining unit 187 stores a position error range, when a position deviation of the peak value is a difference within a pre-set range, whether or not the current image is a right eye image or a left eye image can be determined. Thus, whether or not the current image is a right eye image or a left eye image is determined by the deviation.

Figure 6:
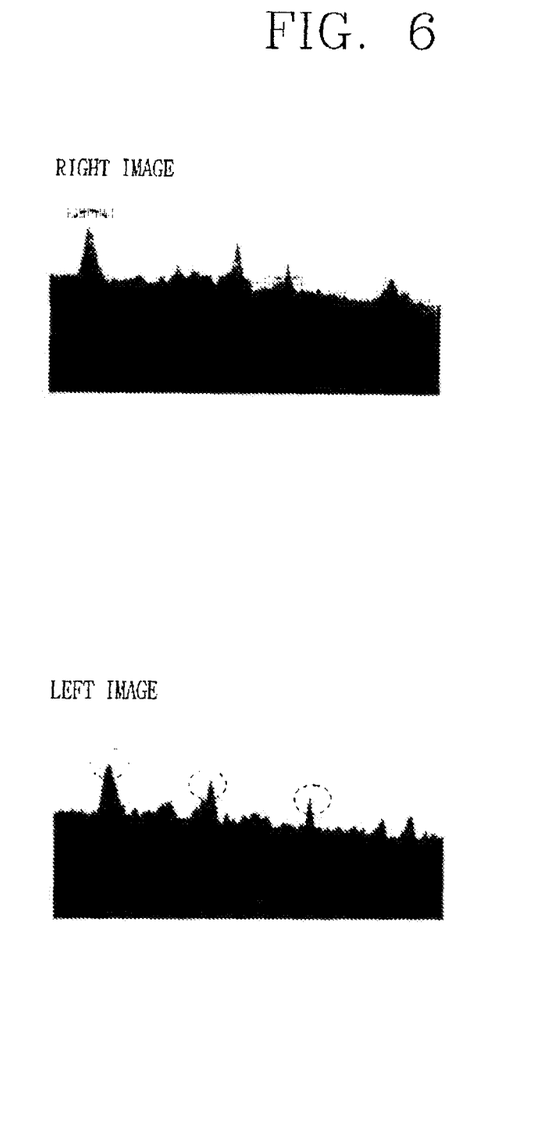
FIG. 6 is a graph showing actual luminance values of a right image (right eye image) and a left image (left eye image)

Actual luminance values of a right image (a right eye image) and a left image (a left eye image) are shown in FIG. 6. As shown in FIG. 6, in the left eye image and the right eye image, the peak values of the luminance and their position on the horizontal line are different, so whether or not the current image is a left eye image or a right eye image can be discriminated by comparing the measured luminance value with the peak positions of the set peak luminance value.

When the image determining unit 187 determines whether or not the current image a right eye image or a left eye image, the synchronization signal generating unit 190 generates a synchronization signal informing whether or not the current image is a right eye image or a left eye image, and transmits the generated synchronization signal to the display device controller 160 and the shutter glasses 120. The display device controller 160 outputs a control signal with respect to the left eye image and the right eye image to the display device 101 according to the signal inputted from the image determining unit 187, and the display device 101 displays the right eye image or the left eye image according to the control signal.

Also, the shutter glasses 120 opens and closes the left eye part or the right eye part according to the synchronization signal inputted from the synchronization signal generating unit 190, so that the right eye image or the left eye image displayed on the display device 101 can be alternately recognized by the user, thus implementing a 3D image.

In the apparatus for displaying a 3D image constructed as described above, the luminance value of the image to be displayed on the display device 101 is calculated, and the peak value of the luminance value is detected according to the calculated luminance value. And then, the detected peak value is compared with the stored peak value, and when the detected peak value corresponds to a right eye peak value, it is determined that the current image is a right eye image, and when the detected peak value corresponds to a left eye image, it is determined that the current image is a left eye image. Thereafter, the synchronization signal is outputted to the display device controller 170 according to the determination information, the corresponding image is displayed on the display device 101 and, at the same time, the synchronization signal is outputted to the shutter glasses 120 to allow the size corresponding to the current image to be open and the other side to be closed, thus implementing a 3D image.

Figure 7:
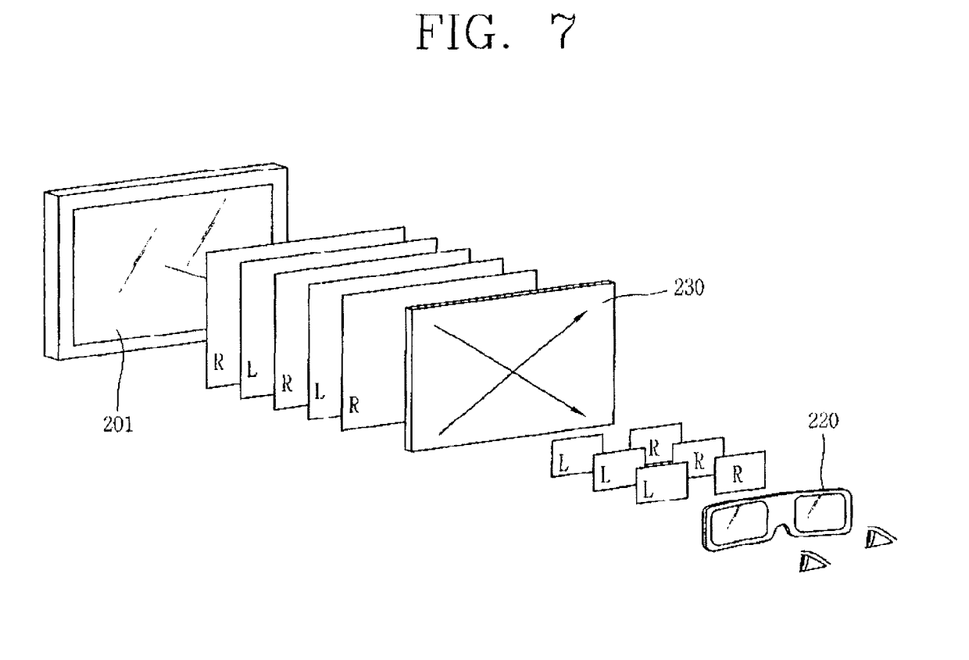
FIG. 7 is a conceptual view of an apparatus for displaying a three-dimensional (3D) image according to a second exemplary embodiment of the present invention.

FIG. 7 is a conceptual view of an apparatus for displaying a three-dimensional (3D) image based on time division according to a second exemplary embodiment of the present invention. In this case, the apparatus for displaying a 3D image based on time division uses a phase retardation plate.

As shown in FIG. 7, in the apparatus for displaying a three-dimensional (3D) image based on time division, a left eye image and a right eye image are alternately displayed on the display device 201. Namely, the left eye image and the right eye image are alternately displayed over time.

Meanwhile, a phase retardation plate 230 is disposed on the front surface of the display device 201. Although not shown, the phase retardation plate 230 includes two substrates which face each other and include a transparent electrode and a liquid crystal layer positioned between the substrates and aligned in a certain direction. Thus, when no signal is applied to the electrodes (in a turned-off state), liquid crystal molecules of the liquid crystal layer are aligned in one direction, allowing light polarized in a first polarization direction to transmit therethrough, and when a signal is applied to the electrodes (in a turned-on state), the alignment direction of the liquid crystal molecules is changed to allow light to transmit therethrough in a second polarization direction.

In other words, on the assumption that the left eye image (L) corresponds to the first polarization direction and the right eye image (R) corresponds to the second polarization direction, when the left eye image (L) and the right eye image (R) are alternately displayed on the display device 201, when no signal is applied to the phase retardation plate 230 (namely, OFF state) in synchronization with the left eye image (L), allowing only the first polarized light to be transmitted, so only the left eye image (L) is allowed to transmit through the phase retardation plate 230.

In this case, because the user wears polarization glasses 220 having left an optical axis in which the left eye part is horizontal to the first polarization direction and the right eye part is horizontal to the second polarization direction, the left eye image (L), which has transmitted through the phase retardation plate 230, transmits through the left eye part of the polarization glasses 220 but is interrupted at the right eye part, so an image can be recognized only at the user's left eye.

Also, when a signal is applied to the phase retardation plate 230 (namely, ON state) in synchronization with the right eye image (R), only the second polarized light is transmitted therethrough. Thus, after only the right eye image (R) transmits through the phase retardation plate 230, it transmits through the right eye part of the polarization glasses 220 but is interrupted at the left eye part of the polarization glasses, so the image is recognized only at the user's right eye.

In this manner, as the left eye image (L) and the right eye image (R) are alternately transmitted with the lapse of time, so the user's left and right eyes view mutually different 2D images, and when the two images are delivered to the user's brain through the retina, the user's brain precisely unites them to allow the user to recognize them as the original 3D image.

The synchronization of the phase retardation plate 230 is performed at the display device. Namely, the image to be displayed on the display device is analyzed to discriminate whether or not the corresponding image is a left eye image or a right eye image, and then the image and the phase retardation plate 230 are synchronized to allow the left eye image or the right eye image to be alternately transmitted through the phase retardation plate 230, thus synchronizing them.

Figure 8:
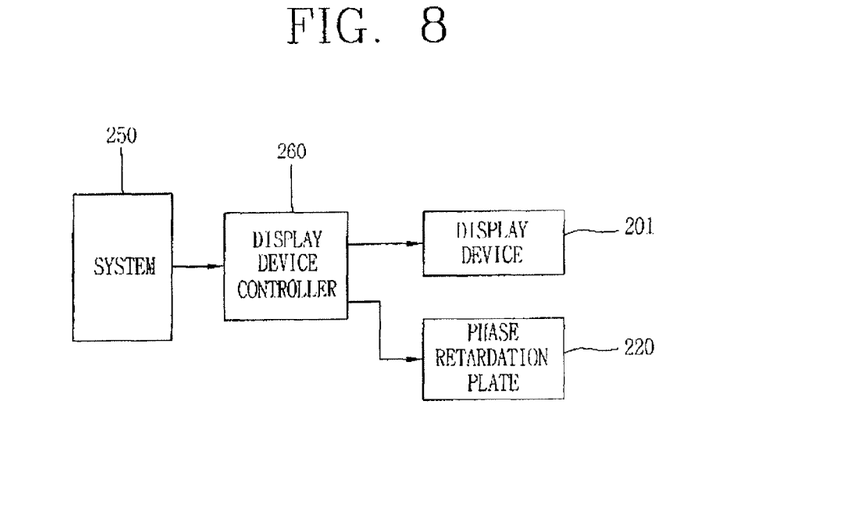
FIG. 8 is a schematic block diagram showing the structure of the apparatus for displaying a three-dimensional (3D) image according to the second exemplary embodiment of the present invention.

FIG. 8 is a schematic block diagram showing the structure of the apparatus for displaying a three-dimensional (3D) image according to the second exemplary embodiment of the present invention.

As shown in FIG. 8, the apparatus for displaying a three-dimensional (3D) image based on time division includes a system 250, such as a main body of a TV or an electronic device, for generating image information, a display device controller 260 for receiving the image information from the system 250 and outputting various signals including a control signal, a display device 201 for displaying an image according to the control signal inputted from the display device controller 160, and phase retardation plate 230 whose polarization state is changed upon being synchronized with an image displayed on the display device 201 upon receiving a synchronization signal from the display device controller 260, to allow an image corresponding to the current polarization state to transmit therethrough.

The system 250 generates an image signal of an image to be displayed and outputs it to the display device controller 260, and the display device controller 260 recognizes whether or not the current image is a right eye image or a left eye image and delivers the same to the phase retardation plate 230 to synchronize the phase retardation plate 230 with the display device 201.

The synchronization of the phase retardation plate 230 may be made at the system 250. Namely, like the apparatus for displaying a 3D image according to the first exemplary embodiment of the present invention illustrated in FIG. 3, the phase retardation plate 230 may be synchronized with the system 250 and a synchronization signal may be delivered to the phase retardation plate 230 through the display device controller 260.

However, in the present exemplary embodiment, the phase retardation plate 230 is attached on the front surface of the display device 201 and a signal applied to the electrode of the phase retardation plate 230 is supplied from the display device controller 260, so in order to simply the process and structure, preferably, the synchronization of the phase retardation plate 230 is executed in the display device controller 260.

The synchronization performed in the display device controller 260 is performed through the same process as that of the first exemplary embodiment of the present invention. In the first exemplary embodiment, however, the synchronization is made in the system, so the elements, e.g., the image discriminating unit (including the luminance value calculating unit, the peak value detecting unit, the peak value comparing unit, and the image determining unit) for generating a synchronization signal are formed on the synchronization signal generating unit system. In comparison, in the present exemplary embodiment, such elements are all formed at the display device controller 260. Thus, the functions of the elements are substantially the same as those of the first exemplary embodiment, so a detailed description thereof will be omitted and will be replaced by the description of FIGS. 4 and 5.

In the first exemplary embodiment of the present invention, the image input unit, the image discriminating unit and the synchronization signal generating unit are formed in the system, while in the present exemplary embodiment, the image input unit, the image discriminating unit and the synchronization signal generating unit are formed in the display device controller, and their functions are the same as those of the first exemplary embodiment. Also, in the first exemplary embodiment of the present invention, the elements, namely, the luminance value calculating unit, the peak value detecting unit, the peak value comparing unit, and the image determining unit of the image discriminating unit are all formed in the system, while in the present exemplary embodiment, the luminance value calculating unit, the peak value detecting unit, the peak value comparing unit, and the image determining unit are all formed in the display device controller.

In the apparatus for displaying a three-dimensional (3D) image constructed as described above, the display device 201 calculates a luminance value of the image to be displayed, and a peak value of the luminance value is detected by the calculated luminance value. And then, the detected peak value is compared with the stored peak value. When the detected peak value corresponds to a right eye peak value, it is determined that the current image is a right eye image, and when the detected peak value corresponds to a left eye peak value, it is determined that the current image is a left eye image. Thereafter, a synchronization signal is outputted to the phase retardation plate 230 from the display device controller 260 according to the determination information to change a polarization state of the phase retardation plate 230 to allow an image corresponding to the corresponding polarization state to transmit therethrough, and as the transmitted image is transmitted to one side of the polarization glasses worn by the user, a 3D image is implemented.

As described above, in the present invention, the synchronization signal is generated based on the current image information, and the shutter glasses or the phase retardation plate is synchronized by the synchronization signal. Thus, because the current image and the shutter glasses or the phase retardation plate can be always synchronized, and thus, the phenomenon that the 3D image is broken due to nonsynchronization between the image and the shutter glasses or the phase retardation plate can be prevented.

Also, in the present invention, because the synchronization is automatically executed in real time, the user does not need to operate a synchronization button, thus improving the user convenience and fully satisfying the user.

In the above description, the present invention is described with a particular structure, but the present invention is not limited to the structure. For example, the display device according to exemplary embodiments of the present invention can be various other display devices. For example, the display device may include flat panel displays of various structures, such as a liquid crystal display (LCD), an organic light emitting display device, a plasma display panel (PDP), or a cathode ray tube (CRT), etc.

In addition, the phase retardation plate is described to have a particular structure, but the present invention is not limited thereto and any phase retardation may be used so long as it has a structure changing the direction of a polarization axis according to an input signal.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. An apparatus for displaying a three-dimensional (3D) image, the apparatus comprising:
  a display device displaying alternately the left eye image and the right eye image; and
  a system generating image information regarding a left eye image and a right eye image and generating a synchronization signal for the left eye image and the right eye image to display alternately the left eye image and the right eye image on the display device, the system including:
- an image input unit receiving images to be displayed on the display device;
- an image discriminating unit for discriminating the left eye image or the right eye image from the images inputted from the image input unit by calculating a luminance value of a current image, detecting a peak value based on the calculated luminance value, position-comparing the detected peak value with a stored peak value of a previous frame, and determining the left eye image or the right eye image based on a result of the position-comparing; and
- a synchronization signal generating unit generating a synchronization signal according to the discrimination result from the image discriminating unit to supply the generated synchronization signal to shutter glasses and the display device to synchronize the shutter glasses and the display device.

2. The apparatus of claim 1, further comprising shutter glasses for opening a left eye part or a right eye part according to the synchronization signal inputted from the system, the left eye part being opened and the right eye part being closed when the left eye image is displayed on the display device and the right eye part being opened and the left eye part being closed when the right eye image is displayed on the display device.

3. The apparatus of claim 1, wherein the display device includes a liquid crystal display (LCD), an organic light emitting display device, a plasma display panel (PDP), and a cathode ray tube (CRT).

4. The apparatus of claim 1, wherein the synchronization signal is wirelessly transferred to the shutter glasses.

5. An apparatus for displaying a three-dimensional (3D) image, the apparatus comprising:
- a system generating image information for a left eye image and a right eye image;
- a display device controller outputting a control signal according to the image information of the system to generate a synchronization signal for the left eye image and the right eye image, the display device controller including:
  - an image input receiving images to be displayed,
  - an image discriminating unit discriminating the left eye image or the right eye image from the received images by calculating a luminance value of a current image, detecting a peak value based on the calculated luminance value, position-comparing the detected peak value with a stored peak value of a previous frame image, and determining the left eye image or the right eye image based on a result of the position-comparing, and
  - a synchronization signal generating unit generating a synchronization signal according to a result from the image discriminating unit to output the generated synchronization signal to shutter glasses and the display device,
- a display device for displaying alternately the left eye image and the right eye image according to the control signal inputted from the display device controller; and
- a phase retardation plate having two optical axes which are respectively parallel to a polarization axis of the left eye image and a polarization axis of the right eye image, the optical axes of the phase retardation plate are changed by the synchronization signal inputted from the display device controller so that the optical axis of the phase retardation plate is parallel to the polarization axis of the left eye image when the left eye image is displayed and the optical axis of the phase retardation plate is parallel to the polarization axis of the right eye image when the right eye image is displayed.

6. The apparatus of claim 5, further comprising:
polarization glasses for transmitting or blocking the light passing the phase retardation plate so that the left eye image reaches at the left eye and the right eye image reaches at the right eye.

7. A method for displaying a 3D image, the method comprising:
- calculating a luminance value of a current image to detect a peak value of the luminance value;
- position-comparing the detected peak value with a stored peak value of a previous frame image to determine whether the current image is a right eye image or the current image is a left eye image;
- outputting a synchronization signal according to a result of the position-comparing; and
- displaying the left eye image or the right eye image according to the synchronization signal.

8. The method of claim 7, wherein, the displaying the left eye image or the right eye image including:
transferring a synchronization signal to the shutter glasses to open and close a left eye part and a right eye part of shutter glasses.

9. The method of claim 7, wherein, the displaying the left eye image or the right eye image including:
Inputting the synchronization signal to a phase retardation plate to change an optical axis of the phase retardation plate so as to transmit the left eye image or right eye image therethrough.

\* \* \* \* \*